United States Patent
Sirivara et al.

(10) Patent No.: US 7,423,978 B2
(45) Date of Patent: *Sep. 9, 2008

(54) DELIVERY OF STREAMING MEDIA

(75) Inventors: Sudheer Sirivara, Hillsboro, OR (US); Jeffrey McVeigh, Portland, OR (US); Robert J. Reese, Lake Oswego, OR (US); Gianni G. Ferrise, Portland, OR (US); Phillip G. Austin, Fountain Hills, AZ (US); Ram R. Rao, Portland, OR (US); Shobhana Subramanian, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/291,861

(22) Filed: Nov. 30, 2005

(65) Prior Publication Data

US 2006/0072476 A1    Apr. 6, 2006

Related U.S. Application Data

(63) Continuation of application No. 09/870,366, filed on May 30, 2001, now Pat. No. 7,020,093.

(51) Int. Cl.
  H04L 12/26    (2006.01)
  H04L 12/56    (2006.01)
  H04N 17/00    (2006.01)
  H04B 1/66    (2006.01)

(52) U.S. Cl. .................. 370/252; 370/254; 370/395.21; 348/192; 375/240.01

(58) Field of Classification Search ......... 370/241–253, 370/395.2–395.21; 709/231; 348/192; 375/240.01–240.07
See application file for complete search history.

(56) References Cited

U.S. PATENT DOCUMENTS

| 5,446,492 | A  |   | 8/1995 | Wolf et al. |
| 5,768,527 | A  | * | 6/1998 | Zhu et al. ................. 709/231 |
| 5,898,668 | A  |   | 4/1999 | Shaffer |
| 5,903,558 | A  |   | 5/1999 | Jones et al. |
| 5,912,701 | A  |   | 6/1999 | Morton, Jr. |
| 6,085,252 | A  |   | 7/2000 | Zhu et al. |
| 6,275,797 | B1 |   | 8/2001 | Randic |
| 6,360,271 | B1 |   | 3/2002 | Schuster et al. |

(Continued)

OTHER PUBLICATIONS

Yon Jun Chung et al., "Real-time streaming video with adaptive bandwidth control and DCT-based error concealment", Circuits and Systems II: Analog and Digital Signal Processing, IEEE Transactions on vol. 46, Issue 7, Jul. 1999, pp. 951-956.*

(Continued)

*Primary Examiner*—Chi H. Pham
*Assistant Examiner*—Tri H. Phan
(74) *Attorney, Agent, or Firm*—Michael R. Barré

(57) ABSTRACT

A method for evaluating an end-user's subjective assessment of streaming media quality includes obtaining reference data characterizing the media stream, and obtaining altered data characterizing the media stream after the media stream has traversed a channel that includes a network. An objective measure of the QOS of the media stream is then determined by comparing the reference data and the altered data.

19 Claims, 1 Drawing Sheet

U.S. PATENT DOCUMENTS

| | | | |
|---|---|---|---|
| 6,363,053 | B1 | 3/2002 | Schuster et al. |
| 6,570,849 | B1 | 5/2003 | Skemer et al. |
| 6,574,218 | B1 * | 6/2003 | Cooklev ............... 370/352 |
| 6,700,953 | B1 | 3/2004 | Maurer et al. |
| 6,701,342 | B1 | 3/2004 | Bartz et al. |
| 6,748,433 | B1 | 6/2004 | Yaakov |
| 7,020,093 | B2 | 3/2006 | Sirivara et al. |
| 7,061,920 | B2 * | 6/2006 | Janko et al. ............ 370/395.5 |
| 2002/0150102 | A1 | 10/2002 | Janko et al. |
| 2002/0184645 | A1 * | 12/2002 | Austin et al. ............ 725/107 |

OTHER PUBLICATIONS

Zhu, Qin-Fan et al., Wang, Y.; Shaw, L.; "Coding and cell-loss recovery in DCT-based packet video", Circuits and Systems for Video Technology, IEEE Transactions on vol. 3, Issue 3, Jun. 1993, pp. 248-258.*

Chung, Yon Jun et al., "Real-time streaming video with adaptive bandwidth control and DCT-based error concealment", *Circuits and Systems II: Analog and Digital Signal Processing, IEEE Transactions*, 46(7):951-956 (Jul. 1999).

Zhu, Qin-Fan et al., "Circuits and Systems for Video Technology", *IEEE Transactions*, 3(3):248-258 (Jun. 1993).

* cited by examiner

DELIVERY OF STREAMING MEDIA

This application is a continuation application of and claims priority under 35 U.S.C. § 120 to application Ser. No. 09/870,366, filed May 30, 2001 now U.S. Pat. No. 7,020,093. Application Ser. No. 09/870,366 is incorporated herein by reference.

FIELD OF INVENTION

This invention relates to delivery of streaming media.

BACKGROUND

Streaming media refers to content, typically audio, video, or both, that is intended to be displayed to an end-user as it is transmitted from a content provider. Because the content is being viewed in real-time, it is important that a continuous and uninterrupted stream be provided to the user. The extent to which a user perceives an uninterrupted stream that displays uncorrupted media is referred to as the "Quality of Service", or QOS, of the system.

A content delivery service typically evaluates its QOS by collecting network statistics and inferring, on the basis of those network statistics, the user's perception of a media stream. These network statistics include such quantities as packet loss and latency that are independent on the nature of the content. The resulting evaluation of QOS is thus content-independent.

DETAILED DESCRIPTION

Figure 1:
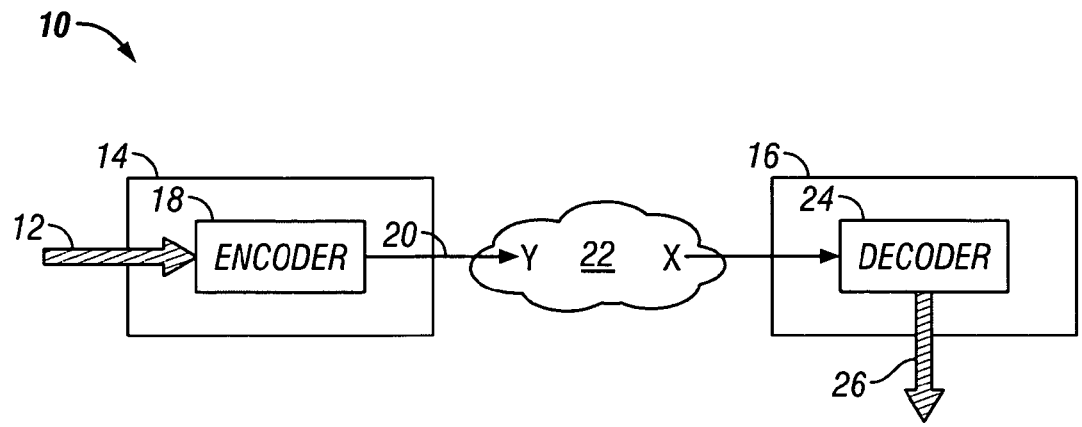
FIGS. 1 and 2 show content delivery systems.

As shown in FIG. 1, a content delivery system 10 for the delivery of a media stream 12 from a content server 14 to a client 16 includes two distinct processes. Because a media stream requires far more bandwidth than can reasonably be accommodated on today's networks, it is first passed through an encoder 18 executing on the content server 14. The encoder 18 transforms the media stream 12 into a compressed form suitable for real-time transmission across a global computer network 22. The resulting encoded media stream 20 then traverses the global computer network 22 until it reaches the client 16. Finally, a decoder 24 executing on the client 16 transforms the encoded media stream 20 into a decoded media stream 26 suitable for display.

In the content delivery system 10 of FIG. 1, there are at least two mechanisms that can impair the media stream. First, the encoder 18 and decoder 24 can introduce errors. For example, many encoding processes discard high-frequency components of an image in an effort to compress the media stream 12. As a result, the decoded media stream 26 may not be a replica of the original media stream 12. Second, the vagaries of network transmission, many of which are merely inconvenient when text or static images are delivered, can seriously impair the real-time delivery of streaming media.

These two impairment mechanisms, hereafter referred to as encoding error and transmission error, combine to affect the end-user's subjective experience in viewing streaming media. However, the end-user's subjective experience also depends on one other factor thus far not considered: the content of the media stream 12 itself.

The extent to which a particular error affects an end-user's enjoyment of a decoded media stream 26 depends on certain features of the media stream 12. For example, a media stream 12 rich in detail will suffer considerably from loss of sharpness that results from discarding too many high frequency components. In contrast, the same loss of sharpness in a media stream 12 rich in impressionist landscapes will scarcely be noticeable.

Figure 2:
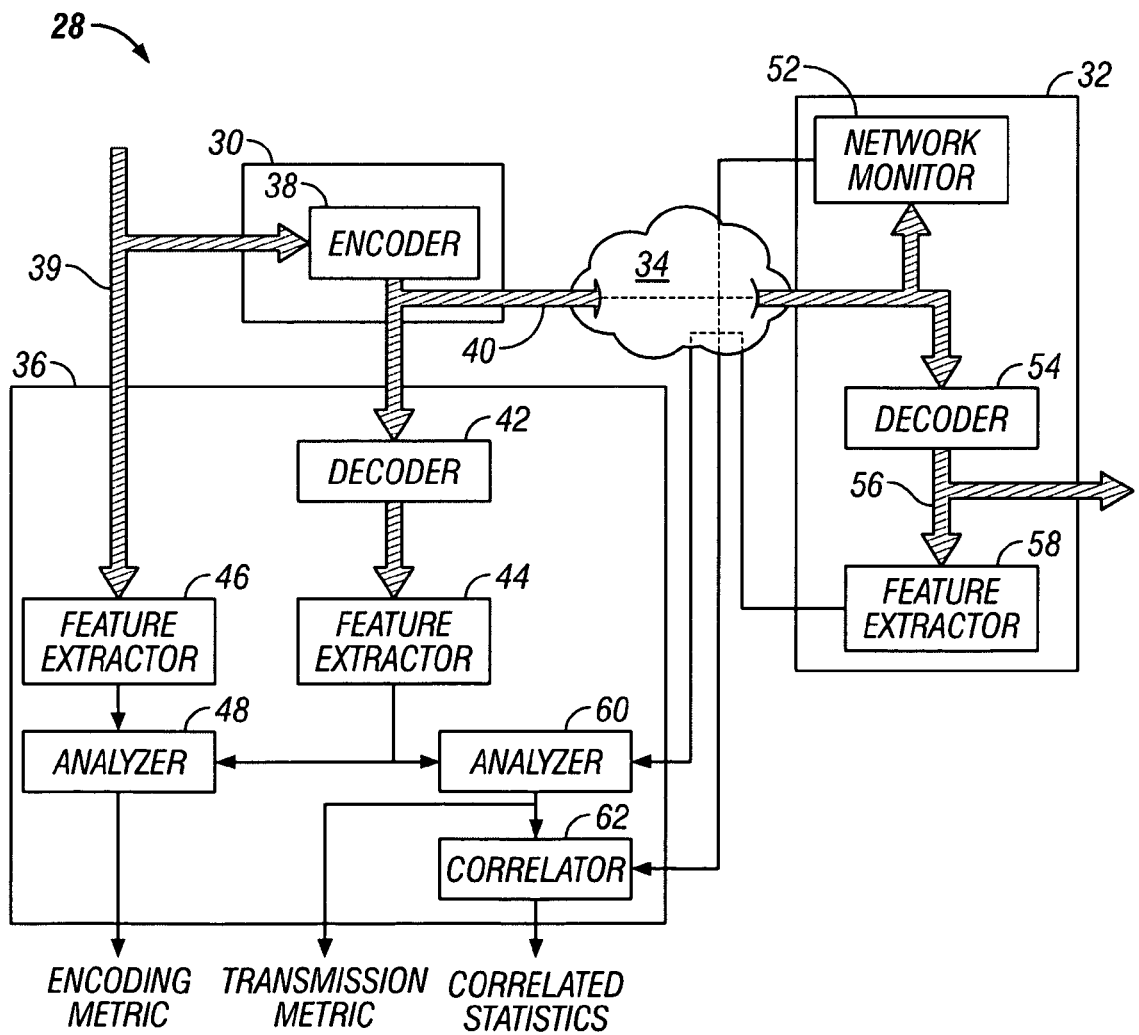

Referring to FIG. 2, a system 28 incorporating the invention includes a content-delivery server 30 in data communication with a client 32 across a global computer network 34. The system 28 also includes an aggregating server 36 in data communication with both the client 32 and the content-delivery server 30. The link between the aggregating server 36 and the client 32 is across the global computer network 34, whereas the link between the aggregating server 36 and the content-delivery server 30 is typically over a local area network.

An encoder 38 executing on the content-delivery server 30 applies an encoding or compression algorithm to the original media stream 39, thereby generating an encoded media stream 40. For simplicity, FIG. 2 is drawn with the output of the encoder 38 leading directly to the global computer network 34, as if encoding occurred in real-time. Although it is possible, and sometimes desirable, to encode streaming media in real-time (for example in the case of video-conferencing applications), in most cases encoding is carried out in advance. In such cases, the encoded media 40 is stored on a mass-storage system (not shown) associated with the content-delivery server 30.

A variety of encoding processes are available. In many cases, these encoding processes are lossy. For example, certain encoding processes will discard high-frequency components of an image under the assumption that, when the image is later decoded, the absence of those high-frequency components will not be apparent to the user. Whether this is indeed the case will depend in part on the features of the image.

In addition to being transmitted to the client 32 over the global computer network 34, the encoded media 40 at the output of the encoder 38 is also provided to the input of a first decoder 42, shown in FIG. 2 as being associated with the aggregating server 36. The first decoder 42 recovers the original media stream to the extent that the possibly lossy encoding performed by the encoder 38 makes it possible to do so.

The output of the decoding process is then provided to a first feature extractor 44, also executing on the aggregating server 36. The first feature extractor 44 implements known feature extraction algorithms for extracting temporal or spatial features of the encoded media 40. Known feature extraction methods include the Sarnoff JND ("Just Noticeable Difference") method and the methods disclosed in ANSI T1.801.03-1996 ("American National Standard for Telecommunications—Digital Transport of One Way Video Signals—Parameters for Objective Performance Specification") specification.

A typical feature-extractor might evaluate a discrete cosine transform ("DCT") of an image or a portion of an image. The distribution of high and low frequencies in the DCT would provide an indication of how much detail is in any particular image. Changes in the distribution of high and low frequencies in DCTs of different images would provide an indication of how rapidly images are changing with time, and hence how much "action" is actually in the moving image.

The original media 39 is also passed through a second feature extractor 46 identical to the first feature extractor 44. The outputs of the first and second feature extractors 44, 46 are then compared by a first analyzer 48. This comparison results in the calculation of an encoding metric indicative of the extent to which the subjective perception of a user would be degraded by the encoding and decoding algorithms by themselves.

An analyzer compares DCTs of two images, both of which are typically matrix quantities, and maps the difference to a scalar. The output of the analyzer is typically a dimensionless quantity between 0 and 1 that represents a normalized measure of how different the frequency distribution of two images are.

The content-delivery server 30 transmits the encoded media 40 to the user by placing it on the global computer network 34. Once on the global computer network 34, the encoded media 40 is subjected to the various difficulties that are commonly encountered when transmitting data of any type on such a network 34. These include jitter, packet loss, and packet latency. In one embodiment, statistics on these and other measures of transmission error are collected by a network performance monitor 52 and made available to the aggregating server 36.

The media stream received by the client 32 is then provided to a second decoder 54 identical to the first decoder 42. A decoded stream 56 from the output of the second decoder 54 is made available for display to the end-user. In addition, the decoded stream 56 is passed through a third feature extractor 58 identical to the first and second feature extractors 44, 46. The output of the third feature extractor 58 is provided to a second analyzer 60.

The inputs to both the first and third feature extractor 44, 58 have been processed by the same encoder 38 and by identical decoders 42, 54. However, unlike the input to the third feature extractor 58, the input to the first feature extractor 44 was never transported across the network 34. Hence, any difference between the outputs of the first and third feature extractors 44, 58 can be attributed to transmission errors alone. This difference is determined by second analyzer 60, which compares the outputs of the first and third feature extractors 44, 58. On the basis of this difference, the second analyzer 60 calculates a transmission metric indicative of the extent to which the subjective perception of a user would be degraded by the transmission error alone.

The system 28 thus provides an estimate of a user's perception of the quality of a media stream on the basis of features in the rendered stream. This estimate is separable into a first portion that depends only on encoding error and a second portion that depends only on transmission error.

Having determined a transmission metric, it is useful to identify the relative effects of different types of transmission errors on the transmission metric. To do so, the network statistics obtained by the network performance monitor 52 and the transmission metric determined by the second analyzer 60 are provided to a correlator 62. The correlator 62 can then correlate the network statistics with values of the transmission metric. The result of this correlation identifies those types of network errors that most significantly affect the end-user's experience.

In one embodiment, the correlator 62 averages network statistics over a fixed time-interval and compares averages thus generated with corresponding averages of transmission metrics for that time-interval. This enables the correlator 62 to establish, for that time interval, contributions of specific network impairments, such as jitter, packet loss, and packet latency, toward the end-user's experience.

Although the various processes are shown in FIG. 1 as executing on specific servers, this is not a requirement. For example, the system 28 can also be configured so that the first decoder 42 executes on the content-delivery server 30 rather than on the aggregating server 36 as shown in FIG. 1. In one embodiment, the output of the first feature extractor is sent to the client and the second analyzer executes at the client rather than at the aggregating server 36. The server selected to execute a particular process depends, to a great extent, on load balancing.

Other embodiments are within the scope of the following claims.

We claim:

1. A method comprising:
   obtaining reference data that measures a media stream from a source computer, said reference data including a mathematical transform of media content in said media stream at said source computer;
   obtaining altered data that measures said media stream after said media stream has traversed a channel that includes a network, said altered data including a mathematical transform of media content in said media stream after said media stream has traversed said channel;
   determining a quality of service of said channel on the basis of a comparison of said reference data and said altered data;
   obtaining network statistics associated with transmission on said channel; and
   correlating said network statistics with said altered data.

2. The method of claim 1, wherein:
   said reference data characterizes at least a portion of an image included in said media stream at said source computer; and
   said altered data characterizes at least a portion of an image included in said media stream after said media stream has traversed said channel.

3. The method of claim 1, wherein said reference data comprises data obtained by applying an algorithm from the group consisting of a Sarnoff JND algorithm and an ANSI T1.801.03 algorithm.

4. The method of claim 1, further comprising:
   comparing said reference data and said altered data.

5. The method of claim 1, wherein said network statistics comprise at least one statistic from the group consisting of jitter, packet loss, and packet latency.

6. The method of claim 1, wherein said channel comprises:
   an encoder to create an encoded representation of said media stream;
   a decoder to recover said media stream from said encoded representation; and
   a computer network between said encoder and said decoder to transmit said encoded representation between said encoder and said decoder.

7. The method of claim 1, wherein obtaining said reference data comprises:
   passing said media stream through an encoder to generate an encoded signal;
   passing said encoded signal through a decoder to generate a decoded media stream; and
   passing said decoded media stream through a feature extractor to extract said reference data.

8. A system comprising:
   a first feature extractor to generate reference data measuring a media stream from a source computer, said reference data including a mathematical transform of media content in said media stream at said source computer;
   a second feature extractor to generate altered data measuring said media stream after said media stream has traversed a channel that includes a network, said altered data including a mathematical transform of media content in said media stream after said media stream has traversed said channel;

an analyzer to compare said reference data and said altered data to generate a transmission metric indicative of a quality of service; and a correlator in communication with said analyzer, said correlator being configured to correlate network statistics associated with said channel with said transmission metric.

9. The system of claim 8, further comprising a network monitor in communication with said correlator, said network monitor being configured to collect said network statistics.

10. The system of claim 8, wherein said correlator is configured to correlate statistics selected from the group consisting of: jitter, packet loss, and packet latency.

11. The system of claim 8, wherein said first feature extractor is configured to extract media features using an algorithm from the group consisting of a Sarnoff JND algorithm and an ANSI T1.801.03 algorithm.

12. The system of claim 8, wherein:

said reference data includes a mathematical transform of at least a portion of an image included in said media stream at said source computer; and said altered data includes a transform of the at least a portion of the image included in said media stream after said media stream has traversed said channel.

13. A computer-readable medium having software encoded thereon, said software comprising instructions which, when executed by a processing system, cause the processing system to perform operations comprising:

obtaining reference data that measures a media stream from a source computer, said reference data including a mathematical transform of media content in said media stream at said source computer;

obtaining altered data that measures said media stream after said media stream has traversed a channel that includes a network, said altered data including a mathematical transform of media content in said media stream after said media stream has traversed said channel;

determining a quality of service of said channel on the basis of a comparison of said reference data and said altered data;

obtaining network statistics associated with transmission on said channel; and correlating said network statistics with said altered data.

14. The computer-readable medium of claim 13, wherein said software comprises:

instructions to generate reference data characterizing at least a portion of an image included in said media stream at said source computer; and instructions to generate altered data characterizing at least a portion of an image included in said media stream after said media stream has traversed said channel.

15. The computer-readable medium of claim 13, wherein said instructions obtain said reference data by applying an algorithm from the group consisting of a Sarnoff JND algorithm and an ANSI T1.801.03 algorithm.

16. The computer-readable medium of claim 13, wherein the operations performed by said instructions comprise:

comparing said reference data and said altered data.

17. The computer-readable medium of claim 13, wherein said instructions to obtain network statistics comprise instructions to process at least one statistic from the group consisting of jitter, packet loss, and packet latency.

18. The computer-readable medium of claim 13, wherein said channel comprises:

an encoder to create an encoded representation of said media stream;

a decoder to recover said media stream from said encoded representation; and a computer network between said encoder and said decoder to transmit said encoded representation between said encoder and said decoder.

19. The computer-readable medium of claim 13, wherein said software generates said reference data by performing operations comprising:

passing said media stream through an encoder to generate an encoded signal;

passing said encoded signal through a decoder to generate a decoded media stream; and passing said decoded media stream through a feature extractor to extract said reference data.

* * * * *